US00RE38829E

(19) United States
(12) Reissued Patent
Shintani

(10) Patent Number: US RE38,829 E
(45) Date of Reissued Patent: Oct. 11, 2005

(54) VIEWING RESTRICTING METHOD AND VIEWING RESTRICTING APPARATUS

(75) Inventor: Peter Shintani, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

(21) Appl. No.: 09/299,425

(22) Filed: Apr. 26, 1999

Related U.S. Patent Documents

Reissue of:
(64) Patent No.: 5,751,335
Issued: May 12, 1998
Appl. No.: 08/604,792
Filed: Feb. 23, 1996

(30) Foreign Application Priority Data

Mar. 10, 1995 (JP) ..... 7-050244

(51) Int. Cl.[7] ..... H04N 7/16; H04N 7/167
(52) U.S. Cl. ..... 725/25; 348/460; 380/202; 380/241; 725/31; 725/39; 725/28
(58) Field of Search ..... 348/5.5, 460; 380/202, 380/241; 725/28, 31

(56) References Cited

U.S. PATENT DOCUMENTS 4,600,921 A * 7/1986 Thomas
4,862,268 A * 8/1989 Campbell et al.
4,888,796 A * 12/1989 Olivo
5,485,518 A * 1/1996 Hunter et al.
5,550,575 A * 8/1996 West et al. ..... 348/5.5
5,579,055 A * 11/1996 Hamilton et al. ..... 348/476
5,583,576 A * 12/1996 Perlman et al.

* cited by examiner

*Primary Examiner*—Stephen C. Buczinski
(74) *Attorney, Agent, or Firm*—Jay H. Maioli

(57) ABSTRACT

A method and apparatus for securely restricting the viewing of television programs. When a television program has been received along with rating data associated with a rating of the television program; length data associated with a length of the program, a microcomputer determines whether the rating data are higher than a predetermined viewing restricting level. If the rating data have been found higher, a muting circuit mutes the television program until it ends with reference to the television program length data, and the program corresponding to the rating data is outputted from a tuner.

12 Claims, 8 Drawing Sheets

VIEWING RESTRICTING METHOD AND VIEWING RESTRICTING APPARATUS

Matter enclosed in heavy brackets [ ] appears in the original patent but forms no part of this reissue specification; matter printed in italics indicates the additions made by reissue.

FIELD OF THE INVENTION

The present invention relates to a viewing restricting method and a television viewing restricting apparatus. More particularly, the present invention relates to a viewing restricting method and viewing restricting apparatus for securely preventing viewers such as children and minors from watching programs of certain types.

BACKGROUND OF THE INVENTION

Programs having a variety of contents are broadcast everyday without minding watchers' concern. For example, some of the TV programs contain scenes of violence or sex that parents do not want their children to watch.

Some receivers such as television receivers that receive programs have a function of restricting the viewing of undesirable programs by muting their images and sounds.

However, the television receivers having such a restricting function require those who supervise children to perform bothersome operations such as setting the channel and broadcast time of a program of which viewing is to be restricted. Moreover, the setting must be made for each program at a time; therefore, the setting is often forgotten allowing children to watch undesirable programs.

To solve such a problem, a method of restricting program viewing is proposed in which a program rating (hereinafter also referred to as rating data) offered by the extended data services (XDS) that has been provided in the United States for example is used. The rating data are associated with program rating; that is, the rating data classify television programs according to their contents. For example, programs are classified in accordance with a viewer's age. Programs are classified into those for any age group and others for particular age groups, viewers over 13 years old for example.

In XDS, data (data transmitted by XDS are hereinafter referred to as XDS data as appropriate), in particular the rating data, are superimposed on line 21 (the 21st horizontal scanning line) of the second field (the even-number field) in a vertical blanking interval of a television signal based on NTSC (National Television System Committee) to be transmitted with a program. Details of XDS are specified in EIA (Electronic Industries Association)-608.

A flowchart of FIG. 8 indicates an example of a method of viewing restraint by use of the rating data transmitted with a program. First, the transmitted program is received in step S41 to be subjected to necessary processing including demodulation. The image and audio signals constituting the received program are output. In step S42, line 21 of the second field is sliced from the image signal to extract the XDS data superimposed on the line 21.

Then, in step S43, it is determined whether the XDS data are rating data or not. If the XDS data have not been found the rating data, the processing goes back to step S41. If the XDS data have been found the rating data, namely, the rating data have been received, the processing goes to step 844. This step determines whether the rating data are higher than a predetermined viewing restraint level or not.

Here, it is assumed that the rating data provide a value that is suitable to an age group for which viewing of a particular program is recommended. To be specific, the rating data of a program for age groups of 17 years old and higher is higher than the rating data of a program for age groups of 13 years old and higher for example and the rating data of a program for adults is higher than the rating data of a program for age groups of 17 years old and higher for example. Consequently, in this case, if received rating data are higher than the rating data of the program for 13 years old and higher, it is not desirable to allow the children under 13 years old (or broadly, around 13 years old) to watch the program that has been received along with the received rating data.

The predetermined viewing restraint level can be set by guardians such as parents. For this level, rating data of programs that parents do not want their children to watch may be set for example.

In step S44, if it is determined that the rating data are higher than the viewing restraint level, the processing goes to step S45. In step S45, the viewing of the program transmitted along with the rating data is restrained, or the image and audio signals of the program corresponding to the rating data are muted, upon which the processing goes back to step S41. Therefore, in this example, the rating data become higher as age groups become higher, so that, if the data rating has been set to a level for a program allowed to viewers of 13 years older and higher, the viewing of the programs for those age below 13 is all restrained.

On the other hand, if it has been determined in step S44 that the rating data are lower than the viewing restraint level, the processing goes to step S46. If the viewing has been muted in step S45, the muting is cleared and the processing goes back to step S41. Namely, if the viewing of a program transmitted on a certain channel for example was restricted in step S45 and then transmitting of a program having rating data lower than the viewing restricting level has started upon ending of the restricted program, the restraint of the viewing is cleared.

According to the above-mentioned method, setting viewing restraint levels alone allows the guardians of children for example to perform TV program viewing restraint.

Meanwhile, the XDS data offered by XDS provide program advertisement when the XDS data are used by viewers for presentation and the like, so that TV stations transmit as the XDS data not only the above-mentioned rate data but also data including program type, title, program identification number (program start identification number), program length, and program time-in-show.

The XDS data containing the above-mentioned data are transmitted in packets. In particular, the rate data are transmitted in the following packet of six bytes:

01h (start control for XDS);
05h (current class type);
rating data 1 (rating byte 1);
rating data 2 (rating byte 2);
checksum code; and
end code.

In the above-mentioned packet, 01h (h denoting hexadecimal notation) indicates a class to which the rating data belong (namely, the current class) and the start of the packet and 05h indicates that the packet is of the rating data. The rating data 1 and 2, checksum code, and end code are one byte long each.

It should be noted that this packet can have two-byte data of the rating data 1 and the rating data 2; however, according to EIA-608 as of Sep. 20, 1994, the rating to be used is only the rating data 1, the rating data 2 being null.

Also, the other XDS data mentioned above are transmitted in a packet of similar type.

Further, when transmitting a packet of rating data continuously at a time, the data length of the packet is equal to the length of the packet, namely six bytes; if the packet cannot be transmitted continuously, the packet is divided for transmission. In this case, a continue byte is transmitted to indicate that the divided portions constitute one packet, making the data length greater than six bytes.

In XDS, in addition to the transmission of each piece of XDS data in the above-mentioned packet, XDS data of a plurality of types may be combined to be transmitted in a composite packet. The combinations to be arranged in a composite packet 1 include the following for example:

program type;

program rating;

length;

time-in-show; and title.

The program type is five bytes long, the rate data is one byte long, the length is two bytes long, and the time-in-show is two bytes long. The title is zero to 22 bytes long.

A following combination of XDS data is also possible as composite packet 2 for example:

program start identification number;

audio services;

caption services;

call letters;

native channel; and network name.

The audio services represent the contents of main audio and second audio, while the caption services represent the contents of teletext. The call letters indicate call letters of local stations. The native channel indicates the channel of a local station. The network name indicates a station network to which the local station belongs. The program start identification number is four types long; the audio services are two bytes long; the caption services are two bytes long; call letter are four bytes long; and the native channel is two bytes long. The network name is 0 to 18 bytes long.

The bandwidth of the XDS data transmitted by XDS is higher than closed captioning data in priority, thereby limiting the bandwidth. To be more specific, the line 21 of the second field can be superimposed with two-byte data, so that its bandwidth is 60 bps (bit per second) (=2 bytes times 30 (the second field/second) but the bandwidth for XDS is limited to less than 30% of the above-mentioned bandwidth as specified in the EIA-608. Consequently, the maximum bandwidth for XDS data is about 20 bps.

If only the composite packets 1 and 2 mentioned above are taken for example, their data amount to 24 to 64 bytes. Therefore, when the bandwidth is 20 bps, the transmission of only the composite packets 1 and 2 takes 1.2 seconds to 3.2 seconds. Further, XDS data are telecast not only from a single station but also a plurality of stations, so XDS data transmission takes more than the above-mentioned times.

Hence, a period in which the rating data arranged in the composite packet 1 are received on the received side becomes fairly long (even when only the composite packets 1 and 2 are transmitted from one station, the rating data receive period becomes 1.2 second).

Meanwhile, in the viewing retraining method described with reference to FIG. 8, rate data are received, viewing restraint is performed and viewing restraint is cleared based on the received rating data. Therefore, if a program on a certain channel is to be restrained, switching from that channel to another viewable channel and then to the first channel again does not restrain that channel until its rating data come, allowing the program that is to be restrained to be viewed. Thus, switching channels in a short period causes the viewing restraining capability to be disabled substantially (it should be noted that, in XDS, data for automatically controlling receiving equipment may be transmitted, also causing this problem).

SUMMARY OF THE INVENTION

It is therefore an object of the present invention to provide a viewing restricting method and a viewing restricting apparatus for securely restraining the viewing of desired television programs.

In carrying out the invention and according to a first aspect thereof, there is provided a method of restraining the viewing of a received television program, the method, if the television program is received along with rating data associated with the television program and program length data that provides information associated with a length of the television program, comprising the steps of: determining whether the rating data satisfy a predetermined condition; and, if the rating data have been found satisfying the predetermined condition, muting the television program corresponding to the rating data until the television program ends with reference to the program length data.

In carrying out the invention and according to a second aspect thereof there is provided an apparatus for restraining the viewing of a received television program, the apparatus, if the television program is received along with rating data associated with the television program and program length data that provides information associated with a length of the television program, comprising: determining means for determining whether the rating data satisfy a predetermined condition; muting means for muting the television program; and control means for controlling, if the rating data have been found satisfying the predetermined condition, the muting means such that the television program corresponding to the rating data is muted until the television program ends with reference to the program length data.

In carrying out the invention and according to a third aspect thereof, there is provided a method of restraining the viewing of a received television program by use of an output apparatus for demodulating the television program, the output apparatus having a channel map containing channel information associated with a channel on which the television program is transmitted, the channel information being necessary for the demodulation, the method, if the television program is received along with rating data associated with a rating of the television program, comprising the steps of: determining whether the rating data satisfy a predetermined condition; and if the rating data have been found satisfying the predetermined condition, deleting the channel information associated with the channel of the television program corresponding to the rating data from the channel map.

In carrying out the invention and according to a fourth aspect thereof, there is provided an apparatus for restraining the viewing of a received television program, the apparatus, if the television program is received along with rate data associated with a rating of the television program, comprising: demodulating means for demodulating the television program and the rating data; storage means for storing a channel map containing channel information associated with each channel on which the television program is transmitted, the channel information being necessary for the demodulating means to demodulate the television program; and deleting means for deleting, if the rating data have been found satisfying the predetermined condition, the channel information associated with the channel of the television program corresponding to the rating data from the channel map stored in the storage means.

In carrying out the invention and according to a fifth aspect thereof, there is provided an apparatus according to the fourth aspect of the present invention further comprising: generating means for generating a channel index that provides information for selecting the television program on the each channel; wherein, if the rating data have been found satisfying the predetermined condition by the determining means, the deleting means also deletes information from the channel index, the information corresponding to the channel of the television program corresponding to the rating data.

In carrying out the invention and according to a sixth aspect thereof, there is provided an apparatus according to the fourth aspect of the present invention wherein, if the television program is received along with an [electrical] *electronic* program guide in addition to the rate data and the rate data have been found satisfying the predetermined condition by the determining means, the deleting means also deletes information from the [electrical] *electronic* program guide, the information corresponding to the channel of the television program corresponding to the rate data.

In carrying out the invention and according to a seventh aspect thereof, there is provided a method of restraining the viewing of a received television program, the method, if the television program is received along with rating data associated with a rating of the television program and identification data for identifying the television program, comprising the steps of: determining whether the rating data satisfy a predetermined condition; if the rating data have been found satisfying the predetermined condition, muting the television program corresponding to the rating data; storing the identification data for the television program; and then also muting the television program corresponding to the identification data if the received identification data match the stored identification data.

In carrying out the invention and according to the eighth aspect thereof, there is provided an apparatus for restraining the viewing of a received television program, the apparatus, if the television program is received along with rating data associated with a rating of the television program and identification data for identifying the television program, comprising: determining means for determining whether the rating data satisfy a predetermined condition; muting means for muting the television program; control means for controlling, if the rating data have been found satisfying the predetermined condition by the determining means, the muting means such that the television program corresponding to the rating data is muted; and storage means for storing, if the rate data have been found satisfying the predetermined condition by the determining means, the identification data for the television program corresponding to the rating data; wherein the control means, if the received identification data match the stored identification data, also controls the muting means such that the television program corresponding to the identification data is muted.

The above and other objects, features and advantages of the present invention will become more apparent from the accompanying drawings, in which like reference numerals are used to identify the same or similar parts in several views.

DETAILED DESCRIPTION OF PREFERRED EMBODIMENTS

This invention will be described in further detail by way of example with reference to the accompanying drawings.

Figure 1:
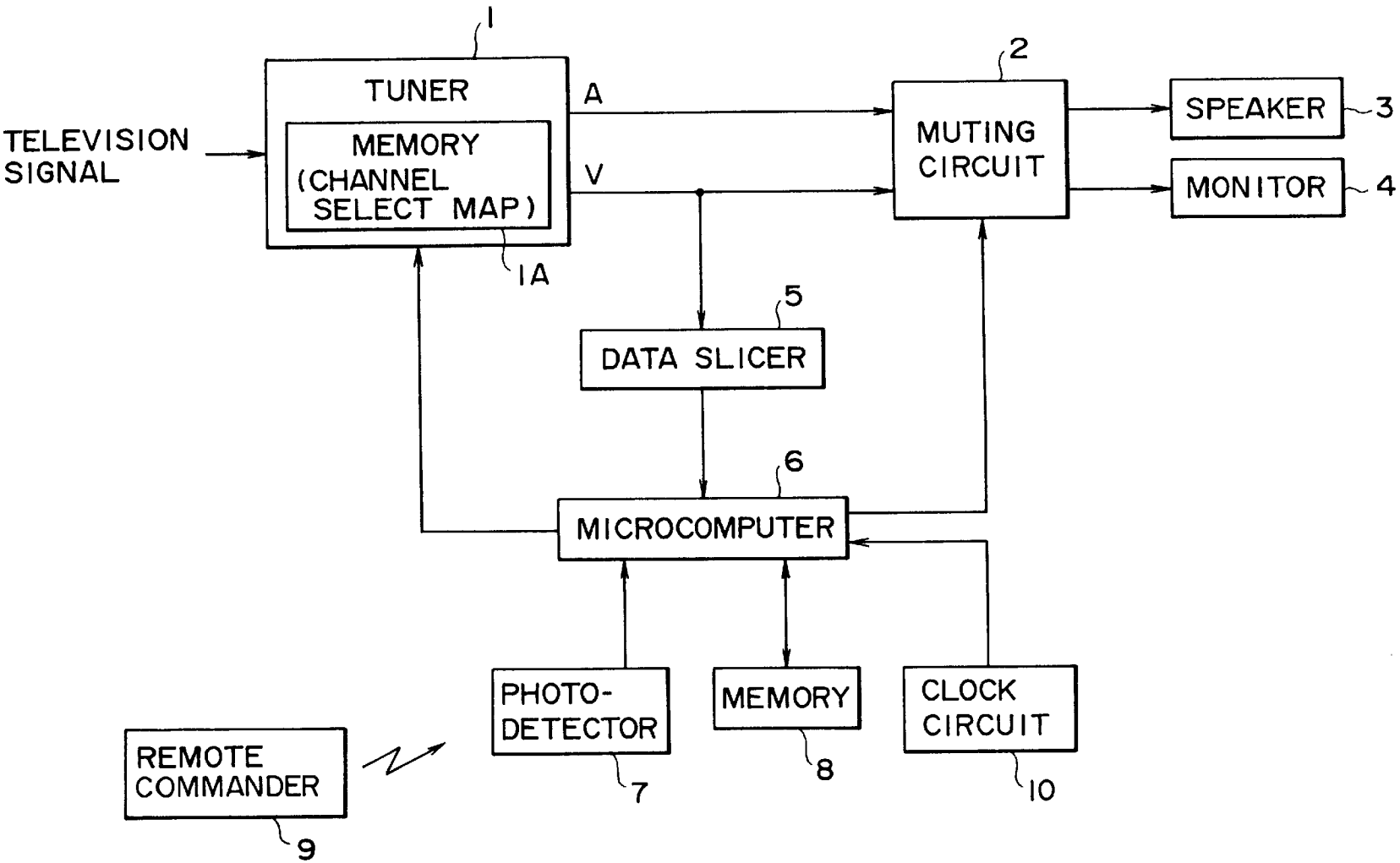
FIG. 1 is a block diagram illustrating a television receiver practiced as a first preferred embodiment of the invention.

Referring to FIG. 1, there is shown a block diagram illustrating a television receiver practiced as a first preferred embodiment of this invention. It should be noted that, in the first preferred embodiment (as well as the other embodiments to be described), the XDS data provided by the above-mentioned XDS are used to restrain television program viewing.

A tuner 1 is adapted to accept a television signal received by an antenna, not shown. The tuner 1 incorporates a memory 1A storing a channel map. The channel map contains channel information necessary for modulating programs on each channel selected. To be specific, the channel map contains the relationship between channels and their carrier frequencies for example. The tuner 1 references the channel map to detect and demodulate a television signal of a channel instructed by a microcomputer 6 and output a video signal (V) and an audio signal (A) constituting a program on the selected channel to a muting circuit 2. The video signal is also fed to a data slicer 5.

The muting circuit 2 is adapted to mute, according to an instruction given by the microcomputer 6, the program (to be specific, the video and audio signals constituting the program) supplied from the tuner 1. It should be noted that if the muting circuit 2 is not instructed by the microcomputer 6 for muting the program, the video or audio signal supplied from the tuner 1 is directly supplied to a monitor 4 or a speaker 3, the speaker 3 and the monitor 4 output respectively the audio signal and the video signal supplied from the tuner 1 via the muting circuit 2.

The data slicer 5 slices line 21 of the second field of the video signal outputted from the tuner 1 to extract XDS data superimposed on the line 21. The extracted XDS data are supplied to the microcomputer 6. According to a signal supplied from a photodetector 7, the microcomputer 6 control the tuner 1 and decodes the signal (the XDS data) supplied from the data slicer 5 to control the muting circuit 2 based on the decoded result. It should be noted that the microcomputer also control a block, not shown, such as a circuit for controlling the volume of the speaker 3 for example, as required.

The photodetector 7 senses infrared radiation coming from a remote commander 9 to convert the received infrared signal to an electrical signal and supply it to the microcomputer 6. A memory 8 is adapted to store necessary data as instructed by the microcomputer 6. The remote commander 9 has numeric keys for selecting channels, channel up and down keys, and other keys. When any of these keys is operated, a corresponding infrared signal is radiated from the commander. It should be noted that the television receiver has an operator panel, not shown. When the operator panel is operated, a same signal as generated by operating the remote commander 9 is sent to the microcomputer 6. A clock circuit 10 supplies current time to the microcomputer 6.

In what followed, the above-mentioned operations will be described with reference to a flowchart of FIG. 2. When a viewer operates the remote commander 9 to select a channel of a program to watch, a signal corresponding to the selected channel is supplied to the microcomputer 6 via the photodetector 7. When the microcomputer 6 receives the signal from the photodetector 7, the microcomputer 6 controls the tuner 1 so that it selects that channel.

In the tuner 1, television signals coming from the antenna are received in step S1 and the television signal of the channel instructed by the microcomputer 6 is detected and demodulated with reference to the channel map, the video and audio signals constituting the program of that extracted. The video signal thus obtained is supplied to the muting circuit 2 and the data slicer 5, while the audio signal is supplied to the muting circuit 2. The video and audio signals supplied to the muting circuit 2 are directly supplied respectively to the monitor 4 and the speaker 3 to be outputted unless muting is instructed by the microcomputer 6.

On receiving the video signal from the tuner 1, the data slicer extracts XDS data from the video signal in step S2 to supply the extracted XDS data to the microcomputer 6. Then, in step S3, the microcomputer 6 decodes the XDS data supplied from the data slicer 5 to determine whether rating data and program length data have been received or not based on the decoded result.

The program length data are about the length of the program by which the end time of the program can be known. To get the program end time, only the program start time and length or the length and a time passed from the start time may be known; therefore, the program length time herein denotes the above-mentioned program start identification number and the length or the length and the time-in-show.

In step S3, if the rating data and the program length data have not been found received, the processing goes back to step S1. The operations of step S1 through step S3 are repeated until the rating data and the program length data are received. Therefore, if no XDS data (the rating data and the program length data) have not been transmitted to the television receiver, no viewing restraint is performed.

On the other hand, if in step S3, the rating data and the program length data have been found received, the processing goes to step S4. In step S4, the microcomputer 6 determines whether the rating data are higher than the predetermined viewing restricting level or not.

It should be noted that, in step S3, the rating data and the program length data need not be received simultaneously. That is, if either the rating data or the program length data have been received first, the microcomputer 6 stores the received data in the memory 8. When the other data have been received, the microcomputer 6 performs the processing of step S4.

It should also be noted that, in step S4, the viewing restricting level to be compared with the rating data may be set in advance by operating the remote commander 9 for example. That is, when a certain key of the remote commander 9 is operated, the microcomputer 6 causes the monitor 4 to display a setting screen for setting the viewing restricting level. A user or a guardian of children can set a desired level on the setting screen.

If the rate data have been not been found higher than the viewing restricting level in step S4, the processing goes back to step S1. Therefore, in this case, no viewing restraint is performed, the audio and video signals being directly outputted from the speaker 3 and the monitor 4 respectively. It should be noted that, if no viewing restricting level is set, the processing goes back to step S1 with the processing of step S4 skipped. Consequently, no viewing restraint is performed also in this case.

If the rating data have been found higher than the viewing restricting level in step S4 (namely, the condition that the rate data is higher than the viewing restricting level has been satisfied), the processing goes to step S5. As long as the channel of the program in question has been selected by the tuner 1, the microcomputer 6 controls the muting circuit 2 to mute the output of the tuner 1.

In step S6, the microcomputer 6 references the program length data to determines whether the program having the rating data higher than the viewing restricting level has ended or not. This determination is made by obtaining the program end time from the program length data and comparing the end time with a current time supplied from the clock circuit 10.

In step S6, if the program having the rating data higher than the viewing restricting level has not been found ended, the processing goes back to step S1. If the program has been found ended, the processing goes to step S7. In step S7, the microcomputer 6 controls the muting circuit 2 to take the channel on which the program having the rate data higher than the viewing restricting level out of the muted state. Then, the processing goes back to step S. Therefore, when the rate data and the program length data of the program with its rate data being higher than the viewing restricting level have been received, the program is kept in the muted state until the program ends.

When the channel on which the program having the rating data higher than the viewing restricting level is in the muted state, if that channel is switched to another and the program being telecast on that channel need not be restrained (namely, if the rating data of that program is not higher than the viewing restricting level), the microcomputer 6 does not cause the muting circuit 2 to mute that program but lets the muting circuit 2 to output the program without muting. It should be noted that the microcomputer 6 keeps recognizing the channel of the program muted in step S5 until the muting is cleared in step S7. Then, when the original channel is selected again, the microcomputer 6 causes again the muting circuit 2 to mute the output of the tuner 1.

As mentioned above, when rating data higher than a viewing restricting level have been received, the program concerned is kept muted until it ends, so that the program can be muted if the rating data are not received thereafter.

In FIG. 1, the television signal transmitted from a television station is received by the tuner 1 and the output thereof is restrained. It will be apparent that, with the television receiver of FIG. 1, television signals reproduced and outputted (transmitted) by a video tape recorder (VTR) for example can also be restrained. In this case, however, it is necessary for the signals transmitted from the VTR to include rating data and program length data.

Figure 3:
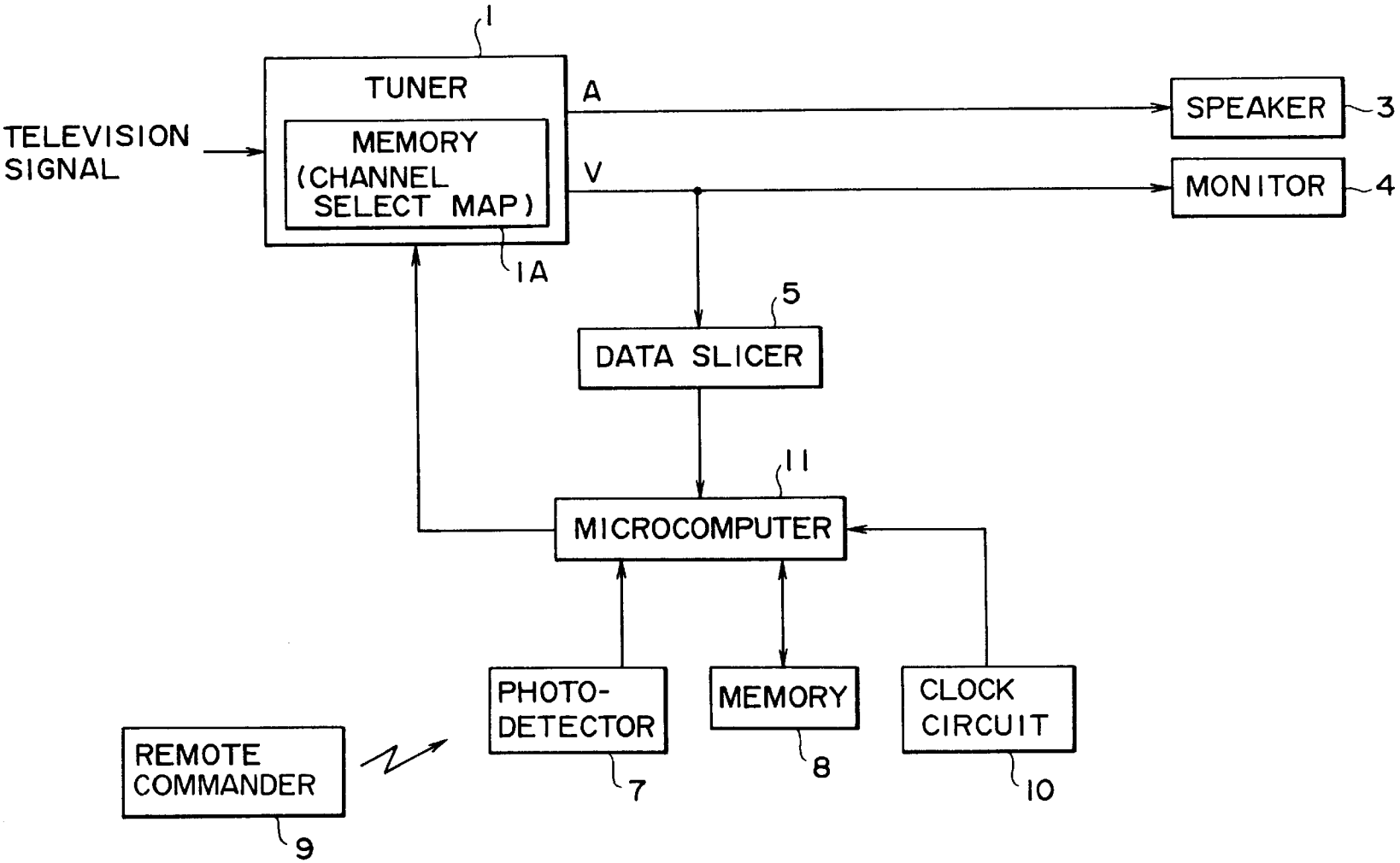
FIG. 3 is a block diagram illustrating a television receiver practiced as a second preferred embodiment of the invention.

Referring to FIG. 3, there is shown a block diagram illustrating a television receiver practiced as a second preferred embodiment of this invention. With reference to FIG. 3, components similar to those previously described with FIG. 1 are denoted by the same reference numerals. Namely, this television receiver is deprived of the muting circuit 2 and provided with a microcomputer 11 instead of the microcomputer 6, the other components being the same as those in FIG. 1.

The microcomputer 11 controls the tuner 1 like the microcomputer 6 of FIG. 1 does and decodes XDS data supplied from the data slicer 5. Based on the decoded result, the microcomputer 11 rewrites the channel map stored in the memory 1A.

In what follows, the above-mentioned operations will be described in detail with reference to a flowchart of FIG. 4. First, in steps S11 through S14, the same processing operations performed in steps S1 through S4 of FIG. 2 are performed respectively. Then, in step S14, if the rating data have been found higher than the viewing restricting level, the processing goes to step S15. In step S15, the microcomputer 11 deletes the channel information about the channel on which the program having those rating data from the channel map stored in the memory 1A. It should be noted that the microcomputer 11 stores that channel information in the memory 8 before the deletion.

Consequently, in this case, the channel of the program of which rating data are higher than the viewing restricting level cannot be detected and demodulated by the tuner 1, thereby restraining the program.

The processing then goes to step S16, in which the microcomputer 11 references the program length data to determine whether the program having the rating data higher than the viewing restricting level has ended or not in the same manner as with step S6 of FIG. 1. In step S16, if the program has been found not ended, the processing goes back to step S11. If the program has been found ended, the processing goes to step S17, in which the microcomputer 11 returns the channel map to its original state, on which the processing goes back to S11. Namely, the microcomputer 11 writes the channel information stored in the memory 8 to the channel map.

As a result, once the rating data and program length data have been received, the program having those rating data higher than the viewing restricting level cannot be received until that program ends.

Thus, when the rating data higher than the viewing restricting level have been received, the channel information about the program having those rating data is deleted from the channel map, thereby restraining that program if the rating data are not received thereafter.

According to the television receiver of FIG. 3, programs having rating data lower than a predetermined viewing restricting level can be viewed as with the case of FIG. 1. Viewing of the programs having the rate data higher than the viewing restricting level is kept restrained until they end. Further, in this case, the television receiver is put in the state in which whether a program is telecast on that channel is not known from the viewpoint of the viewer. Therefore, in the case of FIG. 1, the screen of the monitor 4 is muted, so that it is known that a program is being telecast on the muted channel, thereby causing children to want to watch that channel. In the case of FIG. 3, however, telecasting of a program is not known at all, thereby preventing children from wanting to watch the program.

Further, in the case of FIG. 3, the channel information is deleted from the channel map. Consequently, if a favorite channel is stored in the remote commander 9 for example and the remote commander 9 is provided with a favorite key for selecting the stored favorite program with a single touch and a jump/swap key for selecting the channel viewed last with a single touch, operating these keys does not make the restrained programs viewable. The same holds true with the television receiver of FIG. 1 and the television receivers of FIGS. 5 and 6 to be described.

In the above-mentioned preferred embodiments, the channel information is deleted from the channel map. It will be apparent that the channel information may also be masked to prevent the tuner 1 from using it. It should be noted that the term "delete" as used herein refers broadly to making the channel information unavailable to the tuner 1 as described above.

Figure 5:
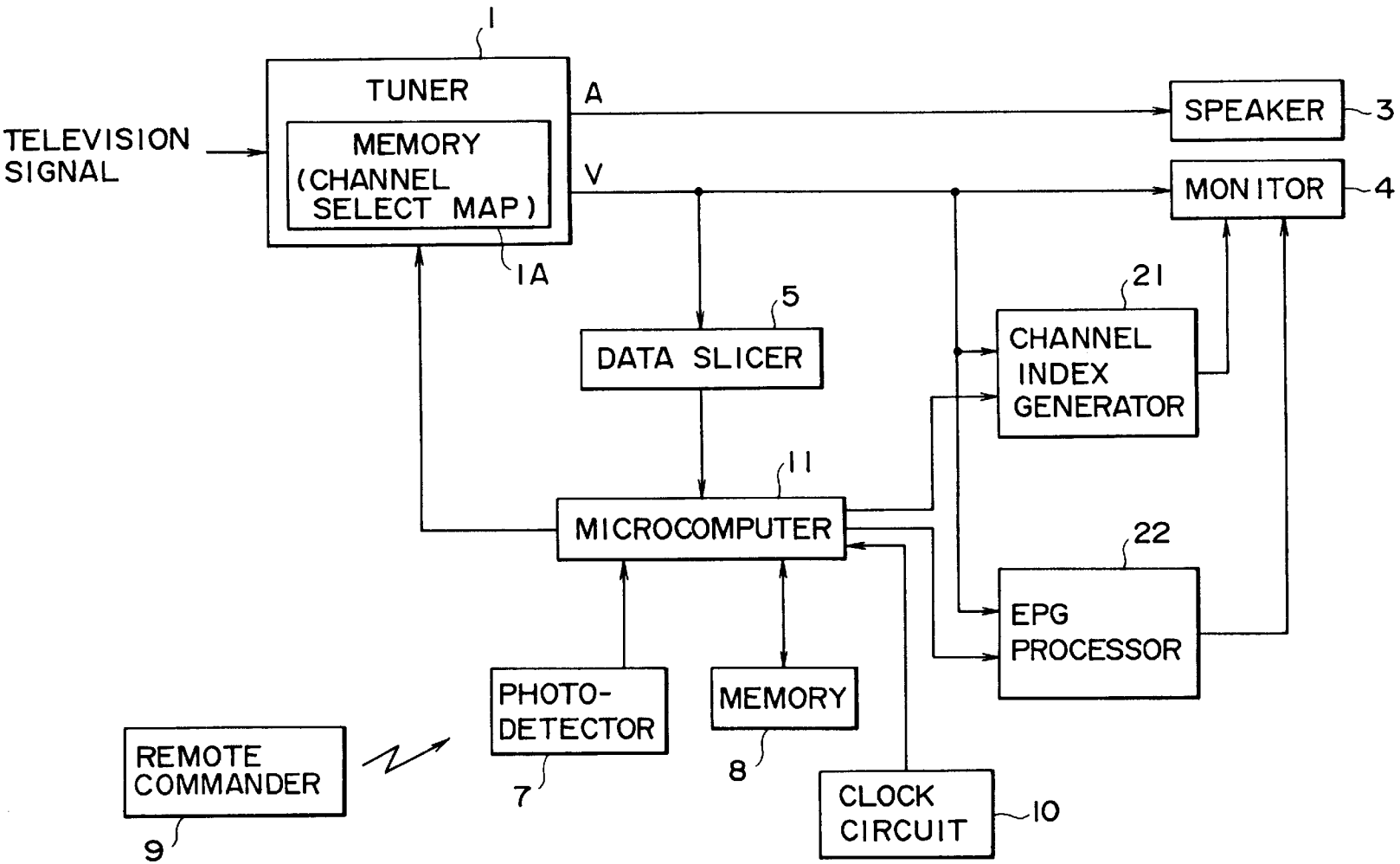
FIG. 5 is a block diagram illustrating a television receiver practiced as a third preferred embodiment of the invention.

Referring to FIG. 5, there is shown a block diagram illustrating the television receiver practiced as a third preferred embodiment of this invention. It should be noted that, with reference to FIG. 5, components similar to these previously described with FIG. 3 are denoted by the same reference numerals. Namely, the third preferred embodiment is constituted in generally the same way as the second preferred embodiment except a channel index generator 21 and an EPG ([Electrical] *Electronic* Program Guide) processor 22.

The channel index generator 21 generates a channel index (for example, a multi-screen in which sub-screens formed by shrinking the screens of programs on channels are arranged in matrix), namely information for selecting a program on each channel based on the output of the tuner 1. This channel index is displayed on the monitor 4 as instructed by the microcomputer 11.

The EPG processor 22 performs predetermined processing on an [electrical] *electronic* program guide (EPG) transmitted from a television station to display it onto the monitor 4 as instructed by the microcomputer 11.

In the television receiver thus constituted, when the remote commander 9 is operated for displaying a channel index, the microcomputer 11 instructs the channel index generator 21 to output the channel index. When thus instructed, the channel index generator 21 generates the channel index from the output of the tuner 1 to be displayed onto the monitor 4. Looking at the displayed channel index, the viewer easily knows the contents of a program being telecast on each channel. As a result, the viewer can select a desired channel according to the program contents.

If the remote commander is operated for displaying the EPG, the microcomputer 11 instructs the EPG Processor to take the EPG from the output of the tuner 1 to display the EPG onto the monitor 4. The EPG includes titles and lengths of programs on each channel for example. Looking at the EPG, the viewer can select desired programs.

Meanwhile, in generating the channel index, positions at which sub-screens of channels are arranged are normally fixed, so that the channel index with the arrangement positions for the programs on a restrained channel secured is displayed. This allows children to recognize that a program is being telecast on the channel restrained for viewing. In the case in which the EPG is displayed, information about a program is displayed regardless of whether that program is restrained for viewing or not, also allowing children to recognize that the program is being telecast on the restrained channel.

To solve this problem, the microcomputer 11, if there is a program restrained for viewing, deletes the sub-screen of the channel of the program from the channel index generated by the channel index generator 21 and, at the same time, deletes the information associated with the program from the EPG.

Figure 4:
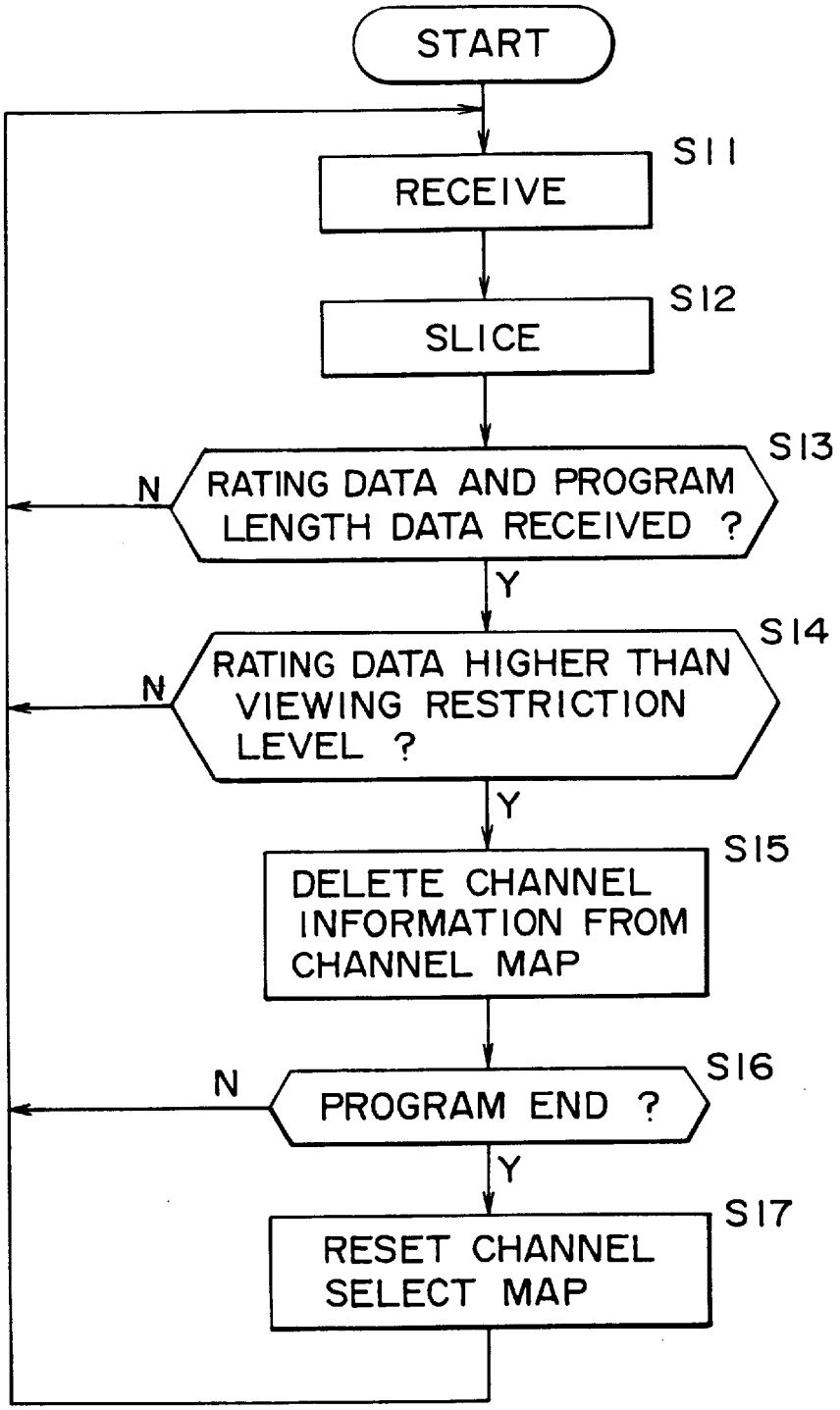
FIG. 4 is a flowchart describing the operations of the embodiment of FIG. 3.

Namely, in the embodiment of FIG. 5, generally the same processing is performed as that of the embodiment of FIG. 3 except for the operations of the steps S15 and S17 of FIG. 4. Further, in the embodiment of FIG. 5, in step S15 of FIG. 4, not only the channel information is deleted but also the sub-screen of a program having rating data higher than a viewing restricting level is deleted from the channel index and the program information associated with that program from the EPG. In step S17 of FIG. 4, the channel map is returned to its original state and the deletion of the subscreen from the channel index or the program information from the EPG is stopped.

Thus, the above-mentioned arrangement prevents the recognition that a program is being telecast on the channel restrained for viewing.

Figure 6:
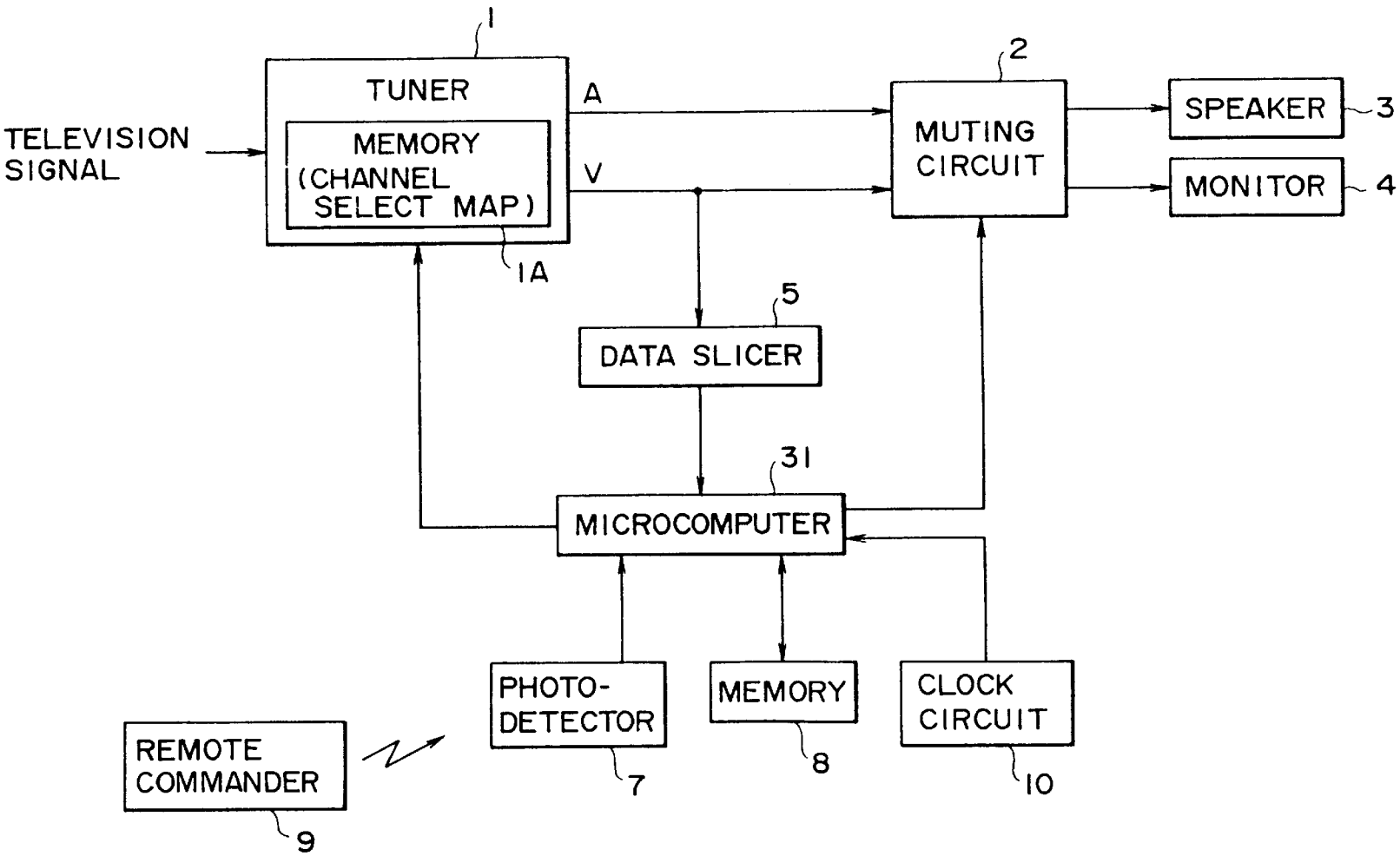
FIG. 6 is a block diagram illustrating a television receiver practiced as a fourth preferred embodiment of the invention.

Referring to FIG. 6, there is shown a block diagram illustrating the television receiver practiced as a fourth preferred embodiment of this invention. It should be noted that components similar to those previously described with FIG. 1 are denoted by the same reference numerals. Namely, the embodiment of FIG. 6 is generally the same as the embodiment of FIG. 1 except for a microcomputer 31 instead of the microcomputer 6.

The microcomputer 31 performs the same processing as that by the microcomputer 6 and, if XDS data transmitted from a television station includes program identification information (also referred to as a program ID) and a program having rating data higher than a viewing restricting level has been received by the microcomputer, stores the program ID of the received program in the memory 8. Thereafter, the microcomputer 31 controls the muting circuit 2 such that the program corresponding to a received program ID that matches the program ID stored in the memory 8 is muted. It should be noted that the memory 8 is formed by a nonvolatile memory for example to retain stored information when the power to the memory is turned off.

For the program ID, the title mentioned above for example may be used.

Figure 7:
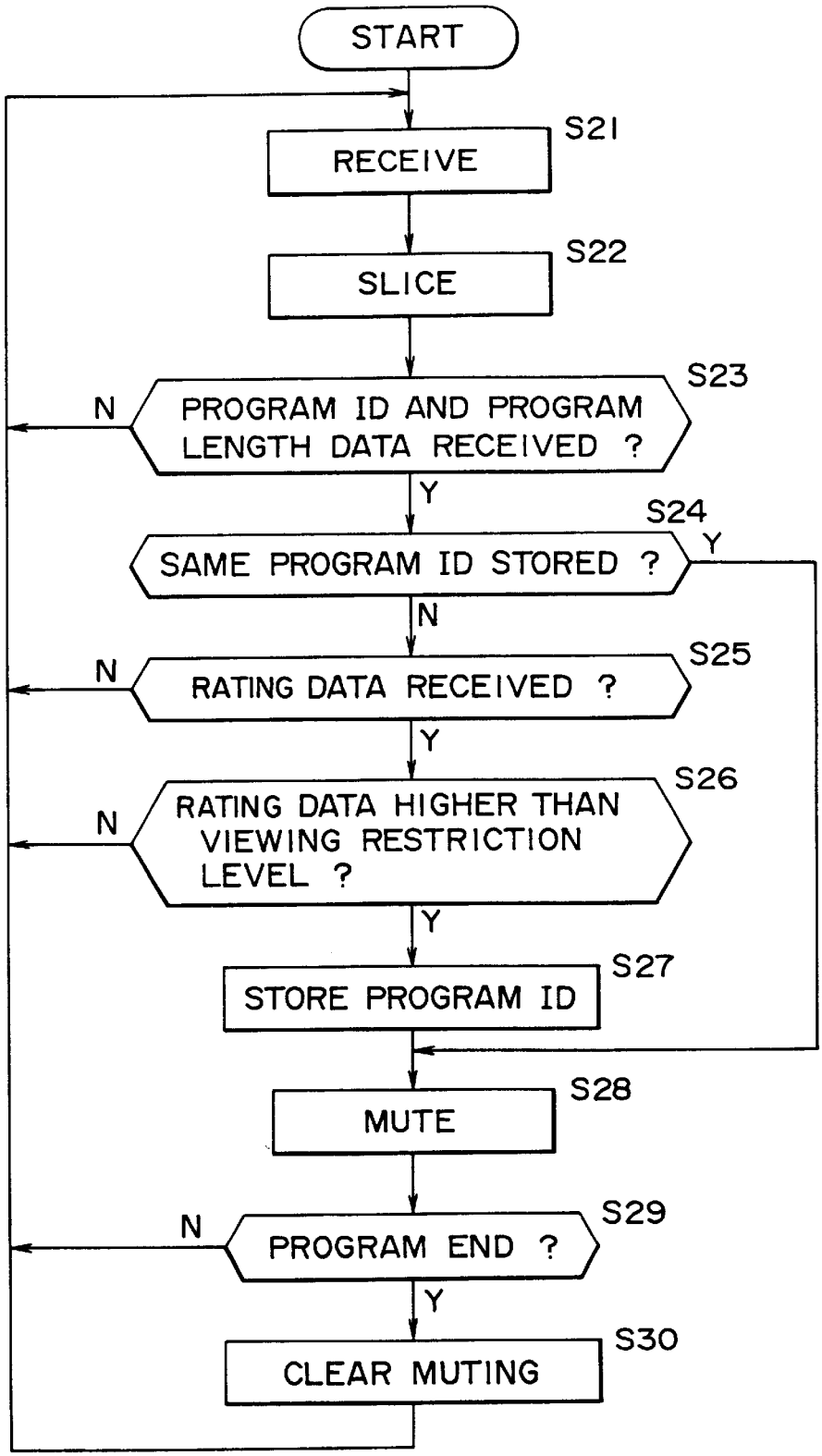
FIG. 7 is a flowchart describing the operations of the embodiment of FIG. 6.
Figure 8:
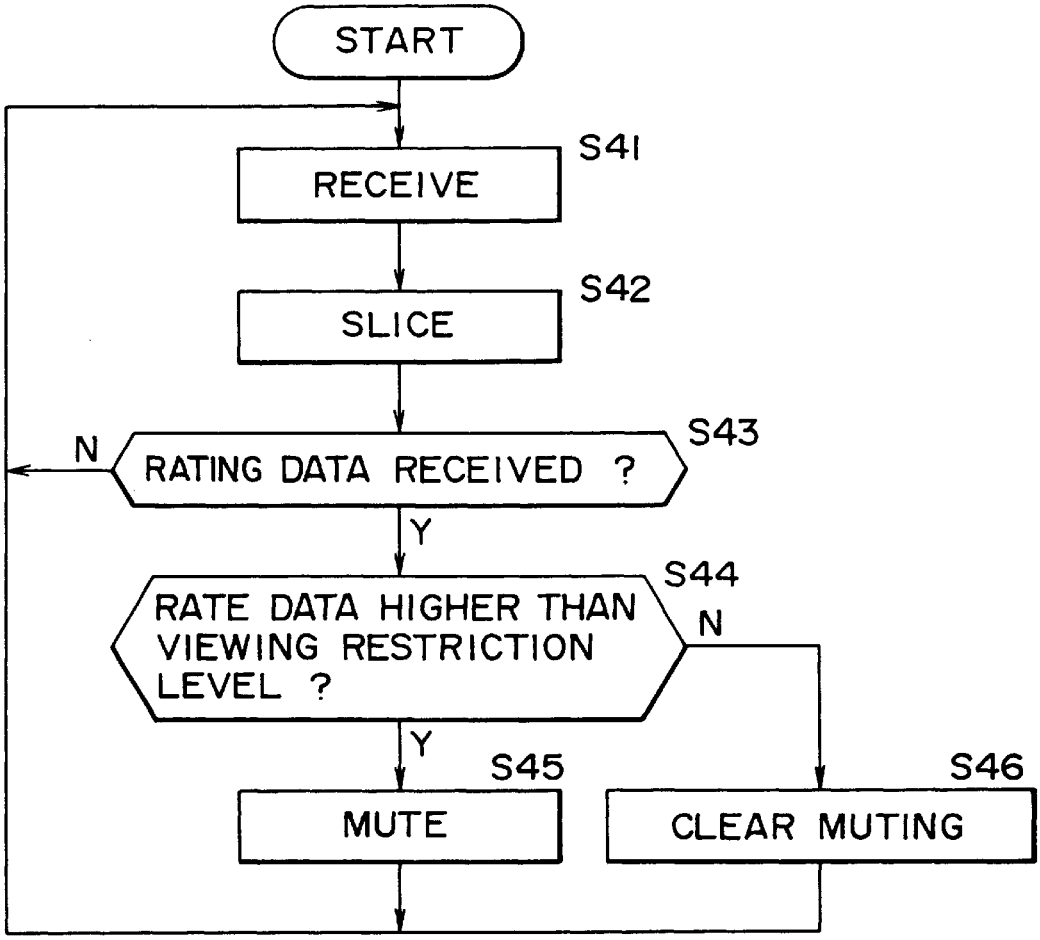
FIG. 8 is a flowchart describing an example of method of performing the viewing restraint by using rate data.

Referring now to FIG. 7, the operations of the fourth preferred embodiment will be described. In the fourth embodiment, the same processing as that performed in step S1 or S2 of FIG. 2 is performed in step S21 or S22. Then, the processing goes to step S23. In this step, the microcomputer 31 determines whether the program ID and program length data have been received or not. If the program ID and the program length data have not been found received, the processing goes back to step S21. If the program ID and the program length data have been found received (in this case also, the program ID and the program length data need not be received simultaneously as described in step S3 of FIG. 2), the processing goes to step S24. In this step, the microcomputer determines whether the same program ID as the received program ID is stored in the memory 8.

If the same program ID as the received program ID has not been found stored in the memory 8, the processing goes to step S25, in which the microcomputer 31 determines whether the rating data have been received or not. If the rating data have not been found received, the processing goes back to step S21. If the rating data have been found received, the processing goes to step S26, in which the microcomputer 31 determines whether the received rating data are higher than the viewing restricting level or not as in step S4 of FIG. 2.

If in step S26 the rating data have been found not higher than the viewing restricting level, the processing goes back to step S21. If the rating data have been found higher than the viewing restricting level, the processing goes to step S27, in which the program ID found higher, namely the program ID of the program having the rating data higher than the viewing restricting level is stored in memory 8.

Figure 2:
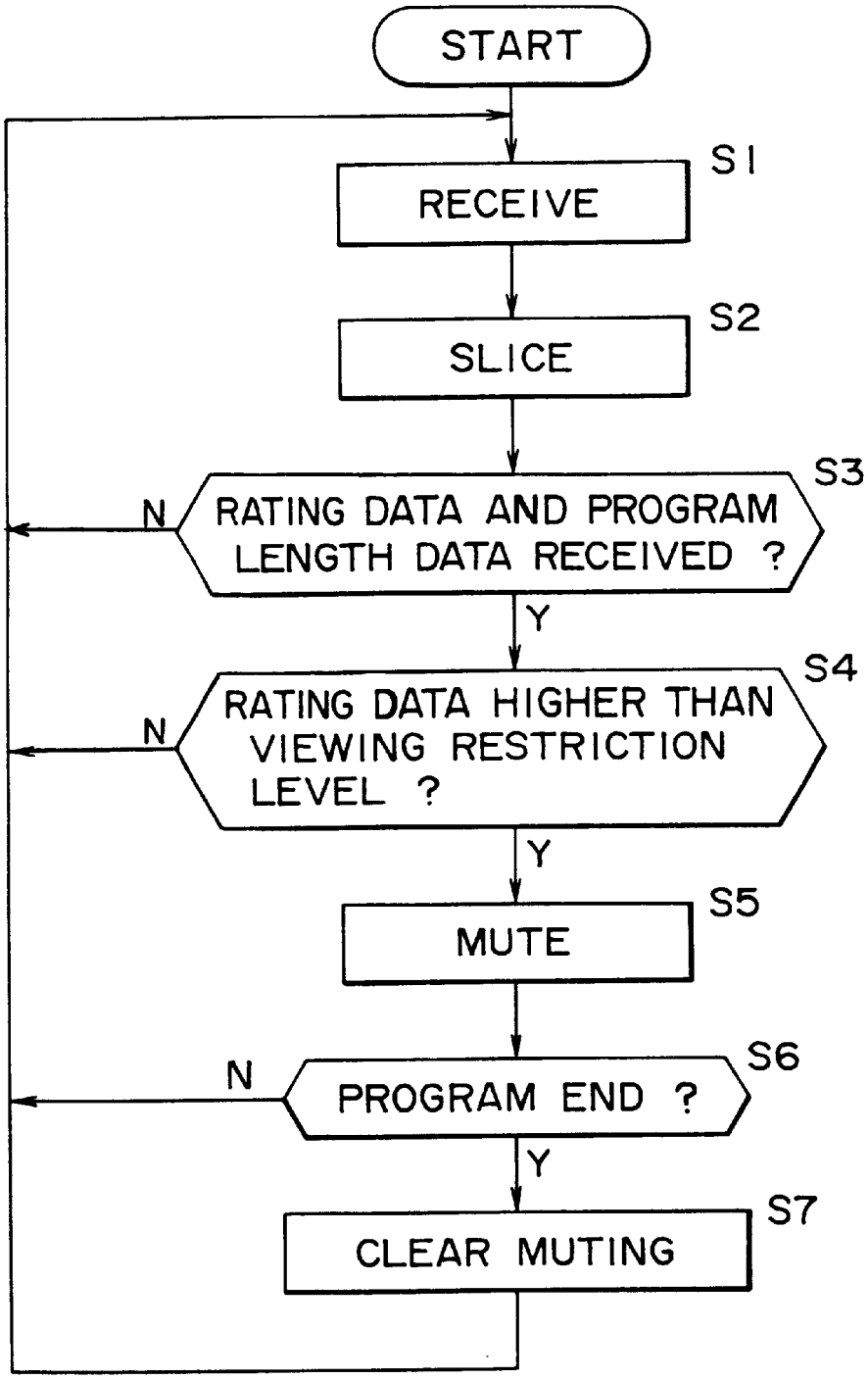
FIG. 2 is a flowchart describing the operations of the embodiment of FIG. 1.

Then, in steps S28 through S3O, the same processing operations as those performed in steps S5 through S7 of FIG. 2 are performed.

On the other hand, if in step S24 the same program ID as the program ID found received in step S23 is stored in the memory 8, the processing skips steps S25 through S27 and goes to steps S28 and on. Therefore, when a program having rating data higher than the viewing restricting level has been received and the program ID of the received program has been stored in the memory 8, the program can be restrained by receiving its program ID without receiving its rating data.

Thus, once the program ID has been stored in the memory 8, the program can be restrained for viewing even if the rating data cannot be obtained because the rating data cannot be decoded or are deleted for example.

It will be apparent that, like the case of FIG. 1, the embodiment of FIG. 6 can restrain the television signals reproduced and outputted (transmitted) from a video tape recorder (VTR) for example in addition to the television signals transmitted from television stations. Further, according to the embodiment of FIG. 6, once the program ID of a program has been stored in the memory 8, the program can be restrained for viewing if the reproduced output of the VTR includes the program ID without including the rating data.

In the above-mentioned preferred embodiments, a title of a program is used for its program ID, which is included in XDS data. It will be apparent that other data such as an ISCI (Industry Standard Coding Identification) code can also be used for the program ID. The ISCI code is superimposed on a scanning line different from the scanning line on which the XDS data are superimposed. By using a data slicer, as the data slicer 5, that can slice variable scanning lines, the data slicer 5 can extract both XDS data and ISCI data. Therefore, a slicer dedicated to extract ISCI data need not be provided, thereby preventing the increase in cost.

Meanwhile, if a television signal bypass terminal is provided on the television receiver according to this invention that provides the secure viewing restraint as mentioned above, a signal coming from the bypass terminal may be supplied to a television receiver having no viewing restraining capability to watch a program on that television receiver. In such a case, if the television receiver of FIG. 1, FIG. 3, FIG. 5 or FIG. 6 is powered off and the above-mentioned viewing restraining capability is disabled, the viewing of programs cannot be restrained. Therefore, it is desirable to always keep the above-mentioned viewing restraining capability in the active state.

While the preferred embodiments of the present invention have been described using specific terms, such description is for illustrative purposes only, and it is to be understood that changes and variations may be made without departing from the spirit or scope of the appended claims.

For example, this invention is applicable to the VTR and other apparatuses in addition to the television receiver.

In the above descriptions about the preferred embodiments according to this invention, the television signal directly transmitted from a television station or a television signal reproduced from the directly television signal recorded on the VTR is restrained for viewing. However, it will be apparent that the viewing restraining methods of FIGS. 1 and 6 can also restrain the viewing of signals (these signals are included in television programs in a broad sense herein) recorded on a magneto-optical disc or other recording media although it is necessary for these recording media to be recorded with data equivalent to the above-mentioned rate data and program length data.

In the above-mentioned preferred embodiments according to this invention, the viewing restraint is performed by using the XDS data provided by XDS. It will be apparent that, if data equivalent to the rate data and program length data are provided from television stations by other means than XDS, the viewing restraint can also be performed by using such non-XDS data.

Further, it will be apparent that the above-mentioned preferred embodiments according to this invention can perform the viewing restraint regardless whether the signals constituting a program to be restrained are analog or digital.

What is claimed is:

1. A method for restricting viewing of a program which is transmitted with rating data corresponding to a rating of said program, program length data corresponding to a broadcast length time, and a start time of said program, comprising steps of:

determining whether said rating satisfies a predetermined condition;

calculating an end time of said program from said broadcast length time and said start time; and muting said program corresponding to said rating until said end time of said program when said rating satisfies said predetermined condition.

2. An apparatus for restricting viewing of a program which is transmitted with rating data corresponding to a rating of said program, program length data corresponding to a broadcast length time, and a start time of said program, comprising:

determination means for determining whether said rating satisfies a predetermined condition;

calculating means for calculating an end time of said program from said broadcast length time and said start time;

mute means for muting said program; and control means for controlling said mute means and said calculating means to mute said program corresponding to said rating until said end time of said program when said rating satisfies said predetermined condition.

3. A method for restricting viewing of a program which is transmitted with rating data corresponding to a rating of said program, program length data corresponding to a broadcast length time, and a start time of said program, wherein said program is demodulated and output by an output apparatus that includes a channel map with channel information relating said program to a corresponding channel, comprising steps of:

determining whether said rating satisfies a predetermined condition;

calculating an end time of said program from said broadcast length time and said start time; and eliminating said channel information relating said program to said corresponding channel with said rating from said channel map until said end time of said program when said rating satisfies said predetermined condition.

4. An apparatus for restricting viewing of a program which is transmitted with rating data corresponding to a rating of said program, program length data corresponding to a broadcast length time, and a start time of said program, comprising:

demodulating means for demodulating said program and for obtaining said rating, said broadcast length time, and said start time of said program;

memory means for memorizing a channel map containing channel information relating said program to a corresponding channel;

determination means for determining whether said rating satisfies a predetermined condition;

calculating means for calculating an end time of said program from said broadcast length time and said start time; and elimination means for eliminating said channel information relating said program to said corresponding channel with said rating from said channel map memorized in said memory means until said end time of said program when said rating satisfies said predetermined condition.

5. The apparatus for restricting viewing of a program according to claim 4, further comprising preparing means for preparing a channel index with information for selecting programs on respective channels, wherein said elimination means eliminates said information for selecting said program on its corresponding channel with said rating from said channel index until said end time of said program when said rating satisfies said predetermined condition.

6. The apparatus for restricting viewing of a program according to claim 4, wherein said program is transmitted with an [electric and] *electronic* program guide, and said elimination means eliminates said channel information relating said program to said corresponding channel with said rating from said [electric] *electronic* program guide until said end time of said program when said determination means determines that said rating satisfies said predetermined condition.

7. A method for restricting viewing of a first program which is transmitted with rating data corresponding to a rating of said first program and first identification data for identifying said first program, and a second program which is transmitted with second identification data for identifying said second program, comprising steps of:

determining whether said rating satisfies a predetermined condition;

muting said first program corresponding to said rating when said rating satisfies said predetermined condition; and memorizing said first identification data of said first program when said rating satisfies said predetermined condition, wherein when a subsequently transmitted second identification data is equal to said first identification data, said second program corresponding to said second identification data is muted.

8. An apparatus to restrict viewing of a first program which is transmitted with rating data corresponding to a rating of said first program and first identification data for identifying said first program, and a second program which is transmitted with second identification data for identifying said second program, comprising:

determination means for determining whether said rating satisfies a predetermined condition;

mute means for muting said first program and said second program;

control means for controlling said mute means to mute said first program when said rating satisfies said predetermined condition and for controlling said mute means to mute said second program when said second identification data is equal to said first identification data; and memory means for memorizing said first identification data of said first program corresponding to said rating when said rating satisfies said predetermined condition, wherein when a subsequently transmitted second identification data is equal to said memorized first identification data, said control means controls said mute means to mute said second program corresponding to said second identification data.

*9. An apparatus for restricting viewing of a program which is transmitted with rating data, comprising:*

*data extracting means for extracting program guide information and said rating data from a received television signal;*

*storing means for storing a rating level to restrict viewing of a program in response to a user's instruction; and*

*display control means for selecting channels to be displayed in a program guide display in accordance with said rating level stored in said storing means and for controlling information of a restricted program from being displayed in said program guide display.*

*10. The apparatus according to claim 9, wherein said program guide information includes at least title data and time data of a program.*

*11. A method of restricting viewing of a program which is transmitted with rating data, comprising the steps of:*

*extracting program guide information and said rating data from a received television signal;*

*storing a rating level to restrict viewing of a program in response to a user's instruction; and*

*selecting channels to be displayed in a program guide display in accordance with said rating level and controlling information of a restricted program from being displayed in said program guide display.*

*12. The method according to claim 11, wherein said program guide information includes at least title data and time data of a program.*

* * * * *